(12) United States Patent
Adams et al.

(10) Patent No.: US 7,275,355 B2
(45) Date of Patent: Oct. 2, 2007

(54) BLADE AND GROUND SPEED CONTROL SYSTEM

(75) Inventors: G. Michael Adams, Chilton, WI (US); Arcady Royzen, Brown Deer, WI (US); Gordon E Rado, Thief River Falls, MN (US)

(73) Assignee: Tecumseh Products Company, Tecumseh, MI (US)

( * ) Notice: Subject to any disclaimer, the term of this patent is extended or adjusted under 35 U.S.C. 154(b) by 117 days.

(21) Appl. No.: 11/069,703

(22) Filed: Mar. 1, 2005

(65) Prior Publication Data
US 2005/0166565 A1    Aug. 4, 2005

Related U.S. Application Data

(62) Division of application No. 10/774,825, filed on Feb. 9, 2004, now Pat. No. 6,892,517.

(60) Provisional application No. 60/446,867, filed on Feb. 12, 2003.

(51) Int. Cl.
*A01D 34/47* (2006.01)
(52) U.S. Cl. .................... 56/10.2 H; 56/10.2 G
(58) Field of Classification Search ............ 56/14.7, 56/10.2 R, 10.2 H, 10.2 G
See application file for complete search history.

(56) References Cited

U.S. PATENT DOCUMENTS

| | | | |
|---|---|---|---|
| 2,740,246 A * | 4/1956 | Smith et al. ............. | 56/11.4 |
| 3,093,946 A * | 6/1963 | Pitt et al. ............... | 460/6 |
| 4,117,652 A * | 10/1978 | Jones et al. ........... | 56/11.8 |
| 4,967,544 A | 11/1990 | Ziegler et al. .......... | 56/10.2 |
| 5,394,678 A | 3/1995 | Lonn et al. ............ | 56/10.2 |
| 5,447,019 A | 9/1995 | Held et al. ............ | 56/10.2 G |
| 5,497,604 A | 3/1996 | Lonn .................... | 56/10.2 H |
| 5,657,224 A | 8/1997 | Lonn et al. ............ | 364/424.034 |
| 5,873,227 A | 2/1999 | Arner .................. | 56/14.6 |
| 5,901,535 A | 5/1999 | Duckinghaus et al. ... | 56/10.2 G |
| 6,109,009 A | 8/2000 | Benson ................. | 56/10.2 G |
| 6,116,005 A | 9/2000 | Chamberlain .......... | 56/10.2 G |
| 6,167,685 B1 | 1/2001 | Berger et al. ......... | 56/10.2 A |
| 6,230,089 B1 | 5/2001 | Lonn et al. ........... | 701/48 |
| RE37,458 E | 11/2001 | Horsch ................. | 475/72 |
| 6,315,658 B1 | 11/2001 | Weber .................. | 460/6 |
| 6,339,916 B1 | 1/2002 | Benson ................. | 56/10.2 R |
| 6,359,403 B1 | 3/2002 | Pollklas et al. ....... | 318/432 |
| RE37,728 E | 6/2002 | Kamm .................. | 475/37 |
| 6,668,530 B2 | 12/2003 | Kern et al. ............ | 56/10.8 |
| 2002/0124539 A1 | 9/2002 | Van Der Lely et al. . | 56/10.2 B |

* cited by examiner

*Primary Examiner*—Thomas B. Will
*Assistant Examiner*—Alicia Torres
(74) *Attorney, Agent, or Firm*—Baker & Daniels LLP

(57) ABSTRACT

A self-propelled mower with blade and ground speed controls. The mower includes a motor with an output shaft and a rotatable cutting blade mounted on a blade shaft. The motor may be an internal combustion engine. A torque transmitting mechanism such as a variable diameter pulley defines a rotational speed ratio between the output shaft and the blade shaft. A transmission is coupled to the output shaft. Sensors provide an electronic control unit with the blade speed, ground speed and engine speed. The ECU may be used to maintain either a desired blade speed or a desired ground speed. To maintain a desired blade speed, the ECU monitors the blade speed and, when the blade speed diverges from the desired speed, adjusts either the rotational speed ratio of the output shaft and blade shaft or the ground speed of the mower to maintain the desired blade speed.

10 Claims, 4 Drawing Sheets

BLADE AND GROUND SPEED CONTROL SYSTEM

CROSS REFERENCE TO RELATED APPLICATION

This application is a division of application Ser. No. 10/774,825, filed Feb. 9, 2004 now U.S. Pat. No. 6,892,517, entitled BLADE AND GROUND SPEED CONTROL SYSTEM, which claims the benefit under Title 35, U.S.C. § 119(e) of U.S. Provisional Patent Application Ser. No. 60/446,867, entitled BLADE AND GROUND SPEED CONTROL SYSTEM, filed on Feb. 12, 2003.

BACKGROUND OF THE INVENTION

1. Field of the Invention

The present invention relates to blade and ground speed controls in a self-propelled lawn cutting machine.

2. Description of the Related Art

Riding lawn mowers and similar lawn cutting machines conventionally include an engine which both propels the mower and powers the cutting blades. Both the blade speed and the ground speed of the mower are factors which may influence the quality of the resulting cut.

The primary factor determining grass cutting quality in a mower having a rotary blade is blade tip speed. As a general rule, higher blade tip speeds result in a higher quality cut. Safety considerations, however, place an upper limit on blade tip speeds and a blade tip speed of 19,000 feet/min. is generally considered the maximum desirable blade speed within the industry. The ground speed of the lawn mower may also have an impact on the quality of the cut.

In many conventional riding lawn mowers, the cutting blades are connected to the engine by flexible drive belts. In such a lawn mower, the blade speed is a function of the engine speed and belt slippage. The factors which relate the engine speed to the blade speed include the ratio of the engine pulley and the primary mower deck pulley.

Conventional riding lawn mowers also often include a mechanical governor for regulating the speed of the engine. The ground speed of the mower is typically controlled by the operator. If, during mowing operations, the vehicle is operated at an excessive ground speed, excessive clippings may collect in the mower deck inhibiting contact between the blades and the uncut grass resulting in such grass being folded over rather than properly cut. The quality of the cut may also be negatively impacted when the engine is placed under a heavier load and is unable to maintain the desired blade speed at the ground speed determined by the operator. For example, there may be situations where engine does not have sufficient power to maintain the desired blade speed when the mower encounters heavier grass without a reduction in ground speed.

SUMMARY OF THE INVENTION

The present invention provides a self-propelled lawn cutting machine such as a riding lawn mower which maintains a rotating cutting blade at a preselected optimal speed. The mower includes an engine for driving both the cutting blade and a transmission or transaxle which may be a hydrostatic or a mechanical transmission/transaxle. Sensors are used to provide continuous electronic input corresponding to various operating parameters which may include the engine speed, blade speed and ground speed to an electronic control unit ("ECU"). In turn, the ECU controls the operation of the mower to maintain the desired blade speed and/or ground speed.

The invention comprises, in one form thereof, a lawn cutting machine which includes a motor having an output shaft and a rotatable cutting blade rotationally fixed on a blade shaft. A torque transmitting mechanism is operably disposed between the output shaft and the blade shaft. The torque transmitting mechanism transfers rotational motion from the output shaft to the blade shaft and selectively adjusts a rotational speed ratio between the blade shaft and the output shaft. A transmission is operably coupled to the output shaft and has a variable speed driven shaft. A driven wheel is coupled with the driven shaft and is engagable with the ground for propelling the machine at a ground speed. An electronic control unit is also provided. The control unit is operably coupled with the torque transmitting mechanism wherein the control unit adjusts the rotational speed ratio between the blade shaft and the output shaft. The control unit is also operably coupled with the transmission wherein the control unit adjusts the speed of the driven shaft. A blade speed sensor provides the control unit with a blade speed signal representative of the speed of the rotatable cutting blade. A ground speed sensor provides the control unit with a ground speed signal representative of the ground speed of the machine. The control unit monitors the blade speed signal and adjusts one of the speed of the driven shaft and the rotational speed ratio to raise the blade speed when the blade speed falls below a predetermined rate.

The invention comprises, in another form thereof, a lawn cutting machine which includes a motor having an output shaft and a rotatable cutting blade rotationally fixed on a blade shaft. A torque transmitting mechanism is operably disposed between the output shaft and the blade shaft. The torque transmitting mechanism transfers rotational motion from the output shaft to the blade shaft and selectively adjusts a rotational speed ratio between the blade shaft and the output shaft. A transmission is operably coupled to the output shaft and has a variable speed driven shaft. The motor, output shaft, transmission and driven shaft together define a drive train. A driven wheel is coupled with the driven shaft and engagable with the ground for propelling the machine at a ground speed. An electronic control unit is also provided. The control unit is operably coupled with the torque transmitting mechanism wherein the control unit adjusts the rotational speed ratio between the blade shaft and the output shaft. The control unit is operably coupled with the drive train wherein the control unit adjusts the speed of the driven shaft. A blade speed sensor provides the control unit with a blade speed signal representative of the speed of the rotatable cutting blade. A ground speed sensor provides the control unit with a ground speed signal representative of the ground speed of the machine. The control unit monitors the blade speed signal and adjusts one of the speed of the driven shaft and the rotational speed ratio to raise the blade speed when the blade speed falls below a predetermined rate.

The invention comprises, in yet another form thereof, a lawn cutting machine which includes an internal combustion engine adapted to run at a substantially constant engine speed and having an output shaft. The engine may include a mechanical governor operably coupled to the engine wherein the mechanical governor controls the engine speed. The lawn cutting machine further includes a rotatable cutting blade rotationally fixed on a blade shaft and a torque transmitting mechanism operably disposed between the output shaft and the blade shaft. The torque transmitting mechanism transfers rotational motion from the output shaft to the blade shaft and selectively adjusts a rotational speed ratio between the blade shaft and the output shaft. A transmission is operably coupled to the output shaft and has a variable speed driven shaft. A driven wheel is coupled with the driven shaft and is engagable with the ground for propelling the machine at a ground speed. An electronic control unit is operably coupled with the torque transmitting mechanism wherein the control unit adjusts the rotational speed ratio between the blade shaft and the output shaft. The control unit is also operably coupled with the transmission wherein the control unit adjusts the speed of the driven shaft. A blade speed sensor provides the control unit with a blade speed signal representative of the speed of the rotatable cutting blade. A ground speed sensor provides the control unit with a ground speed signal representative of the ground speed of the machine. The control unit monitors the blade speed signal and adjusts one of the speed of the driven shaft and the rotational speed ratio to maintain the blade speed at a substantially constant blade speed value.

In alternative embodiments, the lawn cutting machine may have a control unit wherein, when the blade speed falls below the predetermined rate, the control unit determines if the rotational speed ratio between the blade shaft and the output shaft is less than a predetermined maximum ratio and, if the rotational speed ratio is less than the predetermined maximum ratio, the control unit adjusts the torque transmitting mechanism to increase the speed of the blade shaft relative to the output shaft and, if the rotational speed ratio is not less than the predetermined maximum ratio, the control unit decreases the speed of the driven shaft.

The control unit may also monitor the blade speed signal to determine when the blade speed exceeds a predetermined maximum speed and, when the blade speed exceeds the predetermined maximum speed, the control unit adjusts the rotational speed ratio to decrease the speed of the blade shaft relative to the output shaft. The blade speed sensor may be positioned to measure the rotational speed of the blade shaft. The ground speed sensor may be positioned to measure the rotational speed of the driven shaft. The torque transmitting mechanism may include an adjustable diameter pulley and the motor may be an internal combustion engine.

The invention comprises, in yet another form thereof, a lawn cutting machine having a motor with an output shaft and a rotatable cutting blade rotationally fixed on a blade shaft. A torque transmitting mechanism is operably disposed between the output shaft and the blade shaft. The torque transmitting mechanism transfers rotational motion from the output shaft to the blade shaft and selectively adjusts a rotational speed ratio between the blade shaft and the output shaft. A transmission is operably coupled to the output shaft and a driven wheel is operably coupled to the transmission whereby the machine may be propelled. An electronic control unit is also provided. The control unit is operably coupled with the torque transmitting mechanism for adjustment of the rotational speed ratio between the output shaft and the rotatable cutting blade. The control unit is operably coupled with the transmission for adjustment of the ground speed of the machine. The control unit is programmed to operate the machine in accordance with a quality cut algorithm or a quick cut algorithm. A blade speed sensor provides the control unit with a signal representative of the speed of the rotatable cutting blade. A ground speed sensor provides the control unit with a signal representative of the ground speed of the machine. A user-operable input device provides a signal to the electronic control unit to select between the quality cut algorithm and the quick cut algorithm. When operating the machine in accordance with the quality cut algorithm, the control unit monitors the speed of the cutting blade and adjusts one of the ground speed and the rotational speed ratio between the output shaft and the cutting blade to raise the blade speed when the blade speed falls below a predetermined blade speed value. When operating the machine in accordance with the quick cut algorithm, the control unit monitors the ground speed of the machine and adjusts one of the ground speed and the rotational speed ratio between the output shaft and the cutting blade to raise the ground speed when the ground speed falls below a selected ground speed value.

The control unit may, when implementing the quality cut algorithm and the quick cut algorithm, compare the blade speed with a predetermined maximum speed and when the blade speed exceeds the predetermined maximum speed, the control unit adjusts the rotational speed ratio of the torque transmitting device to decrease the speed of the blade shaft relative to the output shaft.

The quality cut algorithm may include, when the blade speed falls below the predetermined blade speed value, the control unit determining if the rotational speed ratio between the output shaft and the rotatable cutting blade is less than a predetermined maximum rotational speed ratio and, if the rotational speed ratio is less than the predetermined maximum rotational speed ratio value, the control unit adjusts the torque transmitting mechanism to increase the speed of said cutting blade relative to the output shaft and, if the rotational speed ratio is not less than the predetermined maximum rotational speed ratio value, the control unit decreases the ground speed of the machine.

The quick cut algorithm may include, when the ground speed falls below said selected ground speed value, the control unit adjusting the transmission until the ground speed is equivalent to the selected ground speed or the transmission is positioned in a predetermined maximum setting, and wherein if the transmission is positioned in the predetermined maximum setting and the ground speed is less than the selected ground speed, the control unit adjusts the rotational speed ratio to decrease the relative speed of the blade shaft relative to the output shaft.

The motor may be an internal combustion engine and the lawn cutting machine may further include a sensor operably coupled to the engine and providing a signal to the control unit representative of the output of the engine. The quick cut algorithm may further include, when the ground speed falls below the selected ground speed value, the control unit determining if the output of the engine is less than a predetermined maximum output value and, if the output is less than the predetermined maximum output value, the control unit adjusts the transmission to increase the ground speed of the machine and, if the output is not less than the predetermined maximum output value, the control unit adjusts the rotational speed ratio to decrease the relative speed of the cutting blade relative to the output shaft.

The invention comprises, in another form thereof, a method of cutting grass which includes providing a lawn cutting machine having a motor with an output shaft, a rotatable cutting blade and a driven shaft with a driven wheel coupled thereto. The output shaft is operably coupled to the cutting blade and the driven shaft and the driven wheel is engagable with the ground for propelling the machine at a ground speed. The method further includes monitoring the speed of the cutting blade and adjusting one of the speed of the cutting blade and the ground speed to maintain the speed of the cutting blade at a substantially constant blade speed value while simultaneously allowing the ground speed of the machine to vary.

The motor included in the machine provided in such a method may be an internal combustion engine and the method may further include the step of operating the engine at a substantially constant engine speed. A mechanical governor may be used to control the engine speed and maintain it at a substantially constant engine speed. The method may also include the step of monitoring the ground speed of the machine.

The invention comprises, in yet another form thereof, a method of cutting grass which includes providing a lawn cutting machine having a user-operable input device, a motor with an output shaft, a rotatable cutting blade and a driven shaft with a driven wheel coupled thereto. The output shaft is operably coupled to the cutting blade and the driven shaft and the driven wheel is engagable with the ground for propelling the machine at a ground speed. The method further includes monitoring the speed of the cutting blade, monitoring the ground speed of the machine, and selecting one of a quality cut algorithm and a quick cut algorithm based upon a user input and operating the machine in accordance with the selected algorithm. Operating the machine in accordance with the quality cut algorithm includes adjusting one of the speed of the cutting blade and the ground speed to raise the blade speed when the speed of the cutting blade falls below a predetermined blade speed value. Operating the machine in accordance with the quick cut algorithm includes adjusting one of the speed of the cutting blade and the ground speed to raise the ground speed when the ground speed falls below a selected ground speed value.

The invention comprises, in still another form thereof, a method of cutting grass which includes providing a lawn cutting machine having an internal combustion engine with an engine output shaft, a rotatable cutting blade and a driven shaft with a driven wheel coupled thereto. The engine output shaft is operably coupled to the cutting blade and the driven shaft and the driven wheel is engagable with the ground for propelling the machine at a ground speed. The method includes operating the engine at a substantially constant engine speed, monitoring the speed of the cutting blade, and monitoring the ground speed of the machine. Another step is adjusting one of the speed of the cutting blade and the ground speed when one of the speed of the cutting blade and the ground speed falls below a predetermined value without directly adjusting the rotational speed of the engine output shaft. The operation of the engine at a substantially constant engine speed may include the use of a mechanical governor to control the engine speed.

In alternative embodiments of the above described methods, the step of monitoring the speed of the cutting blade may include producing a blade speed signal representative of the speed of said cutting blade and communicating the blade speed signal to an electronic control unit. Similarly, the step of monitoring the ground speed of the machine comprises producing a ground speed signal representative of the ground speed of the machine and communicating the ground speed signal to an electronic control unit. Adjustment of the speed of the cutting blade may include adjusting the effective diameter of a variable diameter pulley operably disposed between the output shaft and the cutting blade. Adjustment of the ground speed may include adjusting a continuously variable transmission operably disposed between the output shaft and the driven shaft.

An advantage of the present invention is that it provides a control system for a mower having a rotary blade which can maintain the blade speed at a desired level, e.g., 19,000 ft./min., and thereby provide a high quality cut.

Another advantage of the present invention is that it provides a mower having a rotary blade which operates at a steady blade speed which provides for cleanly cut grass, even distribution of clippings and a mower which may be relatively easily controlled by the operator.

Another advantage of the present invention is that it provides a control system for a mower which may allows the operator to select between two operating modes wherein one of the operating modes controls the blade speed and ground speed of the mower to optimize the quality of the cut and the other mode controls the blade speed and the ground speed of the mower to optimize the ground speed at which the mower operates.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
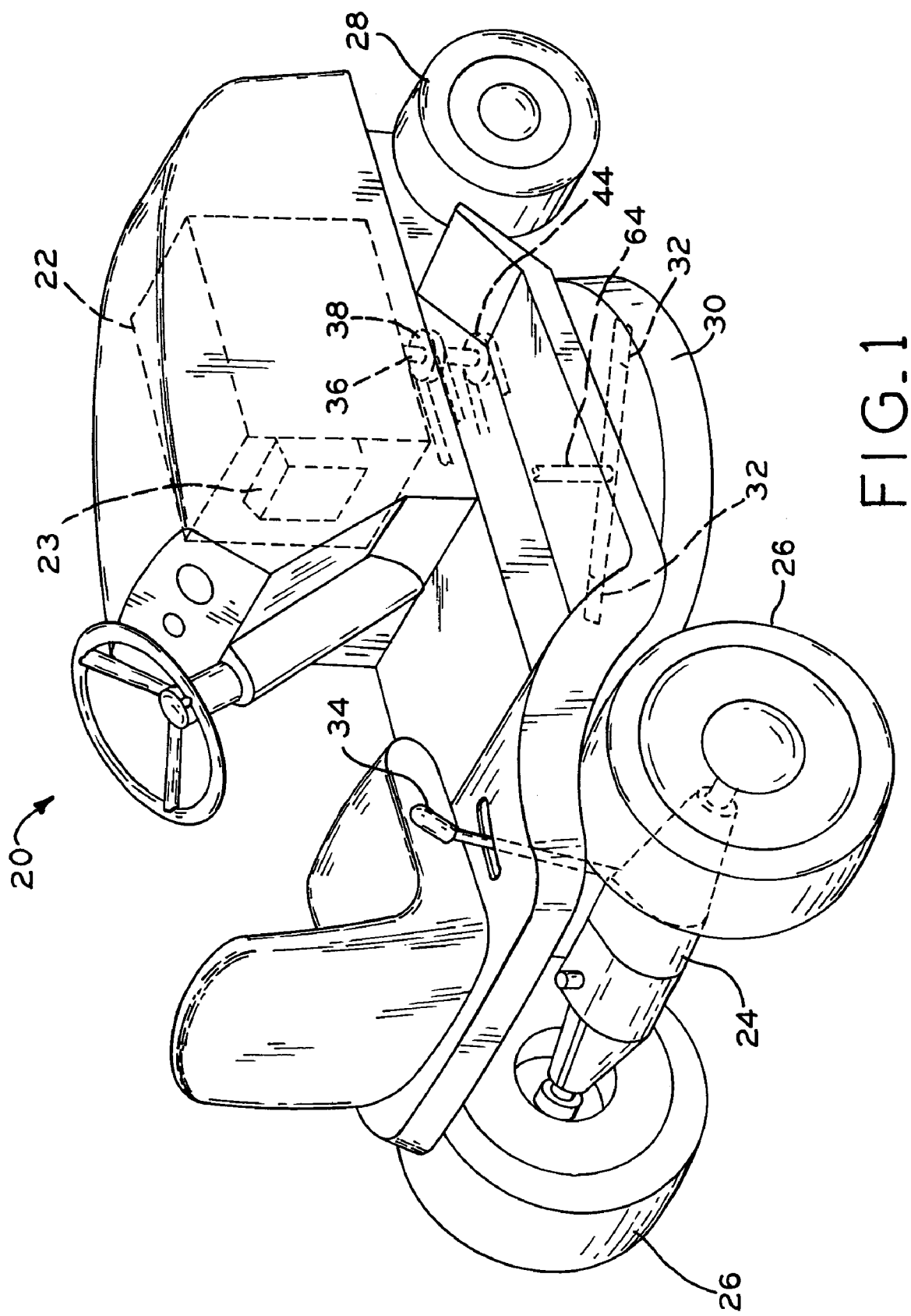
FIG. 1 is a perspective view of a riding lawn mower in accordance with the present invention.

Corresponding reference characters indicate corresponding parts throughout the several views. Although the exemplification set out herein illustrates an embodiment of the invention, it is not intended to be exhaustive or to be construed as limiting the scope of the invention to the precise form disclosed.

DESCRIPTION OF THE PRESENT INVENTION

A riding lawn mower 20 in accordance with the present invention is shown in FIG. 1. Mower 20 includes a motor 22 which, in the illustrated embodiment is an internal combustion engine. Engine 22 is coupled to a transmission 24 which forms part of a transaxle assembly. Transmission/transaxle 24 drives rear wheels 26 to propel mower 20. Front wheels 28 are steerable and, in the illustrated embodiment, are not driven wheels. A mower deck 30 opens downwardly and rotary cutting blades 32 are disposed within deck 30. A shift handle 34 is coupled to transmission/transaxle 24 and is used to vary the output of transmission/transaxle 24 between forward, neutral and reverse.

Transmission/transaxle assemblies which may be used with lawn and garden tractors such as riding mower 20 are well known. Many such transmission/transaxle assemblies are configured to be driven by an engine running at a constant rate of speed and provide an operator controlled variable output, in both speed and direction, for propelling the tractor. In the illustrated embodiment, after selecting the desired speed and direction an electronic control unit maintains mower 20 at the desired ground speed as discussed in greater detail below. Such transmission/transaxle assemblies may have a mechanical or hydrostatic design. One such mechanical transmission/transaxle is disclosed in U.S. Pat.

No. 4,768,997 assigned to the assignee of the present invention and which is hereby expressly incorporated herein by reference. A hydrostatic transmission/transaxle which may be used with the present invention is disclosed in U.S. Pat. No. 6,422,109 B1 assigned to the assignee of the present invention and which is hereby expressly incorporated herein by reference.

Engine 22 is schematically shown as a dashed box and may take the form of a conventional internal combustion engine as typically used with riding lawn mowers. In the illustrated embodiment, engine 22 has a mechanical governor 23 which controls the running speed of engine 22 and maintains engine 22 at a substantially constant engine speed as is well known in the art. One embodiment of a mechanical governor which may be used with the present invention is described in U.S. Pat. No. 6,499,726 assigned to the assignee of the present invention and which is expressly incorporated herein by reference.

Figure 2:
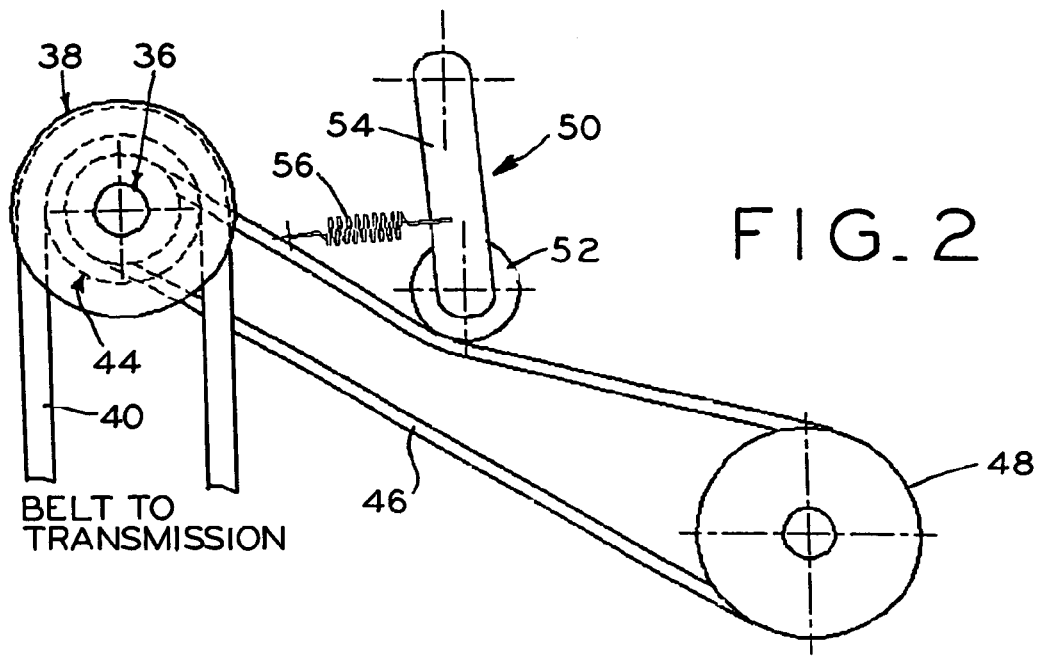
FIG. 2 is a partial plan view of the belt drive for powering the drive wheels and cutting blades of the mower of FIG. 1.
Figure 3:
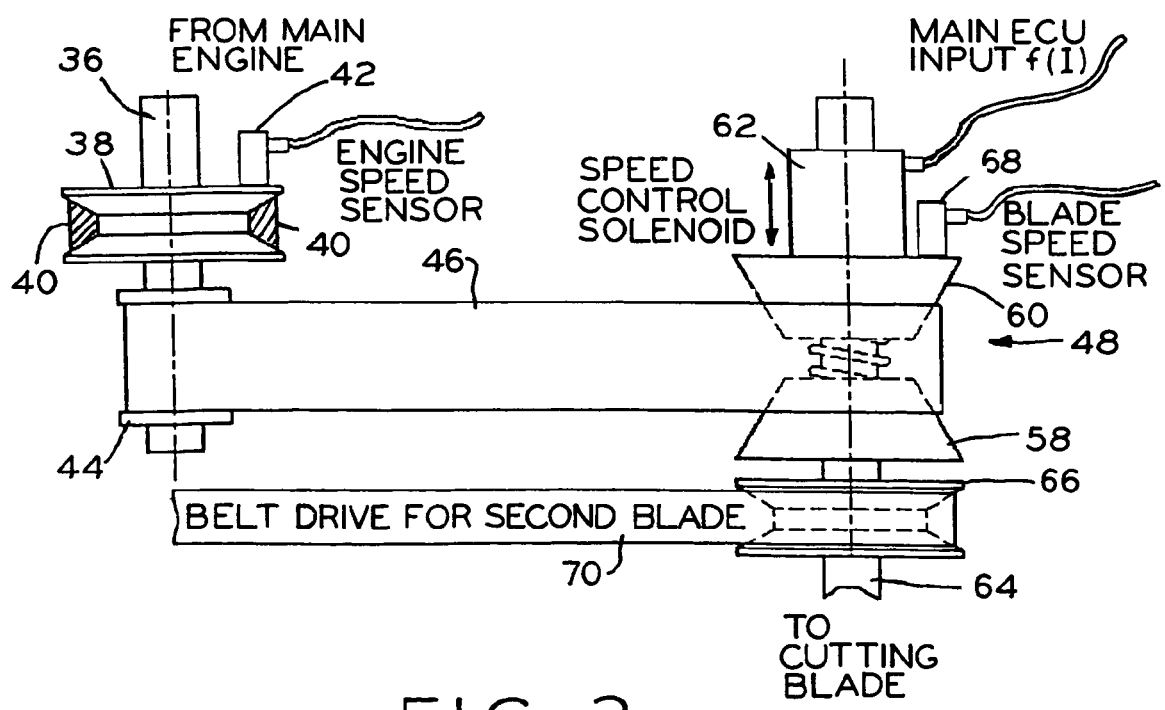
FIG. 3 is a partial side view of the belt drive of FIG. 2.

FIGS. 2 and 3 illustrate the belt drive which transmits power from engine 22 to transmission 24 and cutting blades 32. Output shaft 36 is powered by engine 22 and the rotational speed of shaft 36 directly corresponds to the running speed of engine 22. A first pulley 38 located on shaft 36 drives a belt 40 which is coupled to and drives transmission 24. A sensor 42 is coupled to pulley 38 and senses the rotational speed of pulley 38. Because the rotational speed of pulley 38 directly corresponds to the engine speed, the signal generated by sensor 42 is representative of the engine speed.

A second pulley 44 is located on shaft 36 and belt 46 couples pulley 44 to a variable speed torque transmitting mechanism that includes adjustable diameter pulley 48. A belt tensioning assembly 50 including a rotatable member 52, pivot arm 54 and spring member 56 is used to maintain an appropriate level of tension in belt 46 in a manner which is well known in the art as the diameter of pulley 48 is adjusted. Adjustable pulley 48 includes two frustroconical members 58, 60 which are relatively axially movable. Solenoid 62, or any other suitable device for effecting linear motion, such as a motor-driven rack and pinion mechanism, ball screw, linear actuator or the like, is used to axially move member 60 towards and away from member 58. As members 58 and 60 are moved closer together, the effective diameter of pulley 48 becomes larger. Conversely, as members 58 and 60 are moved axially apart, the effective diameter of pulley 48 becomes smaller. For a given rotational speed of pulley 44, decreasing the effective diameter of pulley 48 will increase the rotational speed of pulley 48 and, conversely, increasing the effective diameter will result in a decrease in the rotational speed of pulley 48. Although a variable diameter pulley mechanism has been disclosed as the torque transmitting device, other mechanisms such as a variable speed mechanical or hydrostatic transmission, variator, etc., could be employed to vary the relative speed of shafts 36 and 64.

Pulley 48 is rotationally fixed on shaft 64 and cutting blades 32 are mounted below pulley 48 on shaft 64. Thus, as pulley 48 is rotated by belt 46, blades 32 are also rotated at the same rotational speed as pulley 48. A sensor 68 is coupled to pulley 48 and senses the rotational speed of pulley 48 and, thus, the signal generated by sensor 68 is representative of the rotational speed of blades 32. Also shown in FIG. 3 is a fourth pulley 66 mounted on shaft 64 between adjustable pulley 48 and cutting blades 32. A belt 70 couples pulley 66 with a second cutting blade assembly (not shown) having a shaft with a pulley and a second set of cutting blades. By providing the second cutting blade assembly with a pulley having the same diameter as pulley 66, the second cutting blade assembly will have a rotational speed which is substantially equivalent to the rotational speed of shaft 64 and attached cutting blades 32. In alternative embodiments, the second cutting blade assembly may be omitted. The length of cutting blades 32 is known and the maximum blade speed at the radially outer tip of blades 32 can be readily calculated if the rotational speed of blades 32 is known. As used herein, blade speed refers to the maximum linear blade speed at the radially outer tip of blades 32.

Figure 4:
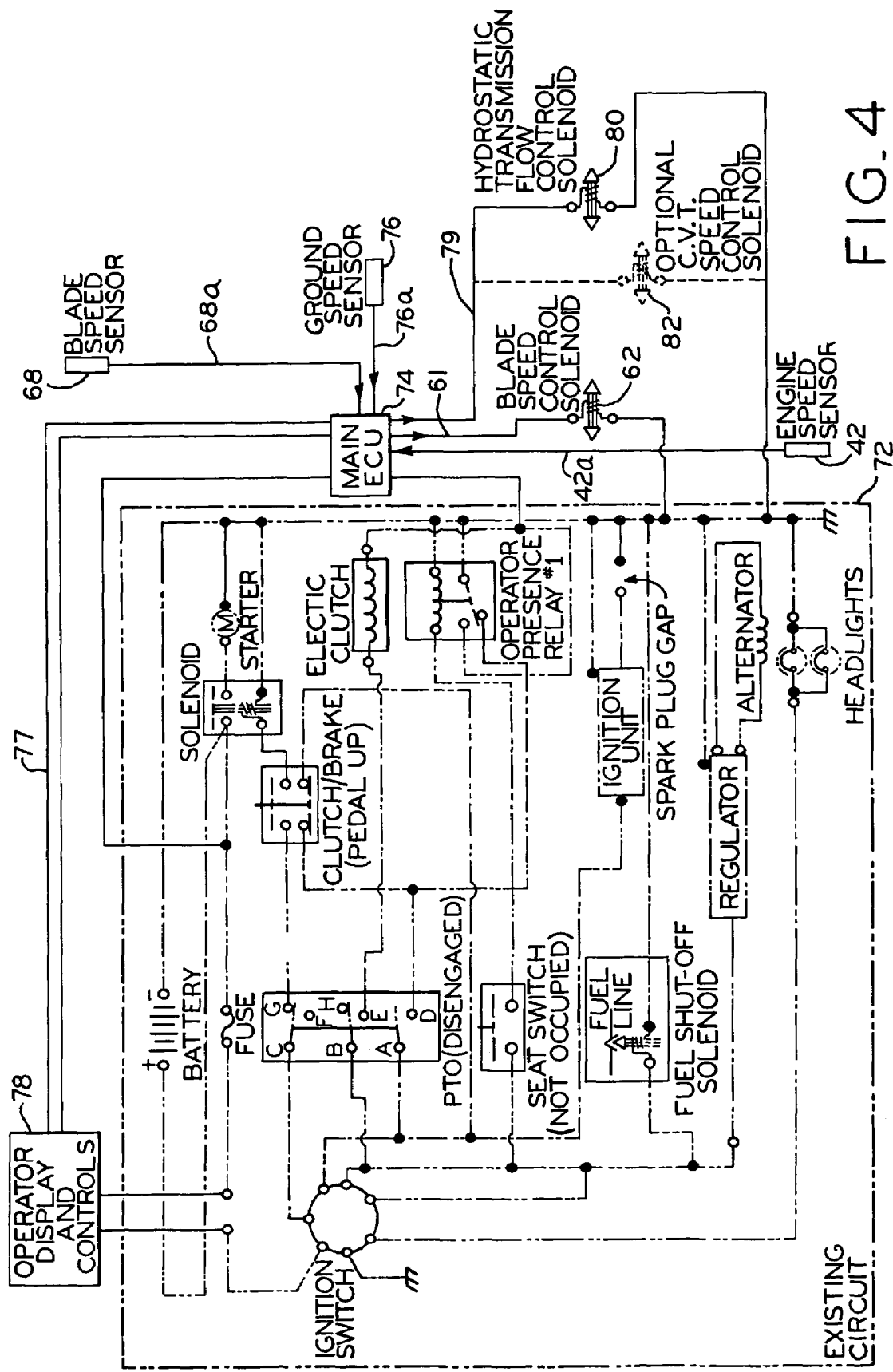
FIG. 4 is a schematic diagram of the mower of FIG. 1.

FIG. 4 illustrates an exemplary schematic wiring diagram of mower 20. That portion of the diagram located within dashed box 72 is similar to existing circuits used with conventional riding lawn mowers and functions in a manner known to those having ordinary skill in the art. Also shown in FIG. 4 is a main electronic control unit, or ECU, 74, engine speed sensor 42, blade speed sensor 68, ground speed sensor 76, an operator display and interface 78, blade speed control device such as solenoid 62, a hydrostatic transmission flow control solenoid 80 and an optional continuously variable transmission ("c.v.t.") speed control solenoid 82. Optional solenoid 82 may be used in substitution for solenoid 80 if a mechanical transmission/transaxle assembly is used with mower 20 instead of a hydrostatic transmission.

Engine speed sensor 42 illustrated in FIG. 3 generates a sinusoidal electronic signal or voltage signal which is transmitted to ECU 74 on output 42a whereupon ECU 74 calculates the rotational speed of engine 22 based upon the signal received from sensor 42. Alternatively, engine speed data could be obtained by monitoring the ignition charge coil signal. As the flywheel magnet passes the charge coil, a voltage spike is produced. The frequency of these spikes is representative of the engine speed and may be monitored to determine the engine speed and/or whether the engine is running at a constant or changing speed.

Similar to engine speed sensor 42, blade speed sensor 68 may be an electronic voltage or square wave generator which produces a signal on output 68a which may be processed by ECU 74 to determine the rotational speed of shaft 64. The ECU also receives a signal representative of the vehicle ground speed on output 76a from sensor 76. The vehicle ground speed signal may be obtained from a signal generator, such as a Hall effect sensor, similar to that used to provide the blade speed signal which is mounted to detect the rotational speed of the driven axle or a non-driven wheel of the lawn mower. Alternatively, the ground speed of the vehicle may be obtained using global positioning system (GPS) sensors, from a sensor monitoring the transmission, or other means known in the art. Engine power output data may also be communicated to ECU 74. Such engine power data may include cylinder pressure or spark plug gap ionization information.

The ECU may be a special encoded microprocessor and may be programmed in different ways for implementing the various embodiments of the present invention. A user input device 78 may also be connected with ECU 74 to allow the operator to select an initial desired ground speed for the mower. When the mower 20 is started engine speed sensor 42, blade speed sensor 68 and ground speed sensor 76 provide continuous measurement signals to ECU 74. ECU 74 may be programmed so that the blade speed is maintained at a preselected optimum speed, e.g., 19,000 ft./min. When the blade is engaged and the blade speed is below the preselected speed, ECU 74 will first provide a speed ratio change signal on output 61 to adjust pulley assembly 48 to alter the ratio between the rotational speed ratio between output shaft 36 and blade shaft 64 to decrease the effective diameter of pulley 48 and thereby increase the speed ratio between shaft 64 and 36 to increase the rotational speed of blade shaft 64. Engine 22 operates at a relatively constant engine speed under normal operating conditions and pulley 48 is configured so that the optimum blade speed may be achieved by adjustment of pulley 48 when engine 22 is operating normally. If engine 22 is under a relatively large load, however, the speed of engine 22 may drop to a point whereby adjustment of pulley 48 will not achieve the desired blade speed. If pulley 48 has already been adjusted to assume its smallest effective diameter, or, adjustment of pulley 48 to its smallest effective diameter does not result in raising the blade speed to the preselected optimal speed, ECU 74 will adjust the swash plate angle of transmission 24 by providing a speed change signal on output 79 to solenoid 80 to reduce the ground speed of mower 20 until the blade speed reaches its preselected optimum speed. By reducing the ground speed of mower 20, the load on engine 22 is reduced, allowing the speed of engine 22 to increase. The reduction of the ground speed of mower 20 also reduces the load on cutting blades 32 which facilitates the raising of the blade speed.

Although the engine speed and thus the rotational speed of output shaft 36 may be altered by the adjustment of pulley 48 or transmission 24, the rotational speed of output shaft 36 is not directly adjusted by the operation of ECU 74. The load conditions requiring the adjustment of pulley 48 or transmission 24 and/or the adjustment of pulley 48 or transmission 24 may result in fluctuations in the engine speed, however, the running speed of engine 22 is maintained at a substantially constant rate by the operation of mechanical governor 23.

In an alternative embodiment, it would be possible for the ECU to monitor the output of engine 22 and, when the blade speed falls below its preselected optimum level and adjustment of pulley 48 is insufficient to raise the blade speed to its preselected optimum level, for the ECU to first increase the operating speed and output of engine 22, such as by the use of a electromechanical servo motor to adjust the engine throttle, until engine 22 has reached a maximum power output level and then, if the blade speed is still below the preselected optimum level, reduce the ground speed of mower 20 to achieve the desired blade speed.

As discussed above, for a mower having a rotary cutting blade such as blade 32, a blade speed of approximately 19,000 feet/minute typically forms the upper limit for the blade speed. Typically, higher blade speeds result in higher quality cuts. The optimum blade speed for a particular mower, however, may be affected by several factors such as the blade diameter, blade housing design and blade lift. Other factors which can impact the optimal speed may include the grass type, the grass height, and whether or not the mower is being operated with a bag for collecting the clippings. ECU 74 may have a predefined optimum blade speed, such as 19,000 feet/minute, which cannot be changed. Alternatively, ECU 74 may use a default blade speed value which may be varied. For example, an input device may allow the operator to input data which is used to determine the optimum blade speed. Such data might include the grass type, the grass height, whether or not a bag is being used to collect the clippings, the desired cut quality and the desired ground speed. It would also be possible to adapt the ECU to local conditions by manually operating the unit and storing the desired operating parameters at the time control is given to the ECU.

In the illustrated embodiment, ECU 74 controls the blade speed and ground speed of mower 20 but the conventional mechanical governor of engine 22 controls the speed of engine 22 and operates independently of ECU 74. ECU 74 monitors the speed of cutting blade 32 and, when the speed of blade 32 falls below a predetermined blade speed value, ECU 74 will adjust either the rotational speed ratio between shafts 36 and 64 or the ground speed of mower 20 to raise the blade speed to its predetermined value. ECU 74 first determines if the rotational speed ratio between shafts 36 and 64 can be adjusted to increase the relative speed of shaft 64. This may be done by calculating the ratio of the rotational speeds of shafts 36 and 64 as measured by sensors 42 and 68 and comparing the resulting value to the ratio value which corresponds to the smallest effective diameter of pulley 48. Alternatively, solenoid 62 could transmit a signal to ECU 74 representative of the position of solenoid 62 which is also representative of the position of moveable pulley member 60 and, thus, of the effective diameter of pulley 48 and the rotational ratio between output shaft 36 and blade shaft 64.

If adjustable diameter pulley 48 may still be adjusted to reduce the effective diameter of pulley 48 and thereby increase the rotational speed of blade shaft 64 relative to output shaft 36, ECU 74 decreases the effective diameter of pulley 48 via solenoid 62 until the blade speed reaches the predetermined optimum value. If, pulley 48 is already positioned in its smallest effective diameter, or, pulley 48 is adjusted to such a position and the blade speed is less than the predetermined optimum blade speed, ECU 74 will adjust the swash plate of transmission 24 via solenoid 80 to reduce the ground speed of mower 20 until the blade speed reaches the predetermined optimum value.

Figure 5:
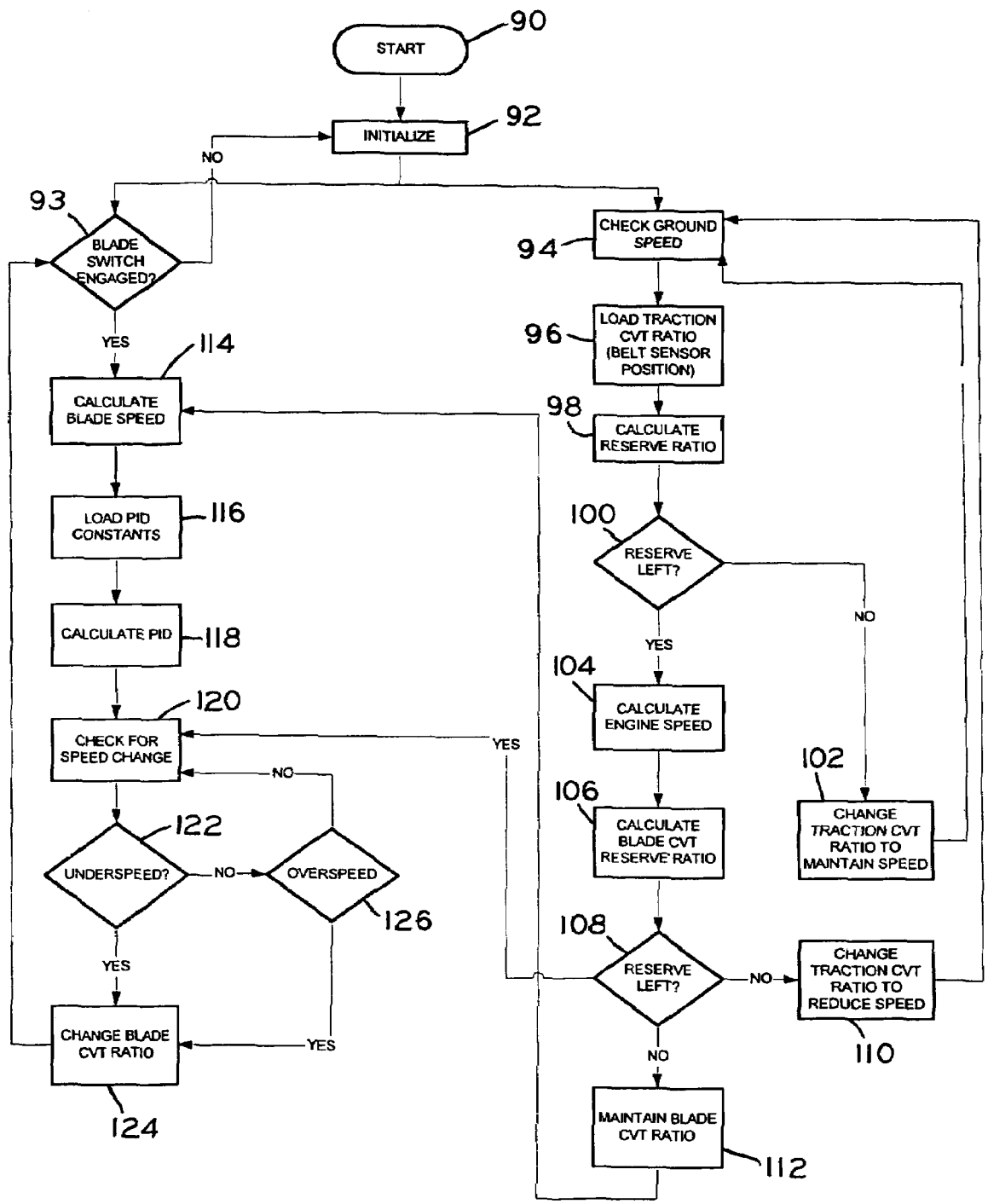
FIG. 5 is a logic diagram representing a software program which may be used with the mower of FIG. 1.

FIG. 5 presents a logic diagram representing the operation of ECU 74 in the illustrated embodiment. Upon starting mower 20 electrical power is delivered to ECU 74. ECU 74 then starts and initializes necessary variables as represented by blocks 90, 92. After initialization of ECU 74, ECU 74 checks the ground speed of mower 20 as measured by sensor 76 as represented by box 94. ECU also determines if the blade switch is engaged and cutting blades 32 are rotating as represented by box 93. If the blade switch is not engaged and blades 32 are not being powered, the process returns to box 92. If the blade switch is engaged, after checking the ground speed at box 94, ECU 74 loads the traction c.v.t. ratio as determined by the belt sensor position as represented by box 96. The traction c.v.t. ratio corresponds to the position of transmission 24 and the rotational speed ratio between output shaft 36 and the shaft driving driven wheels 26. ECU 74 then calculates the reserve ratio for transmission 24 at box 98. Calculating the reserve ratio involves comparing the current c.v.t. ratio with the maximum ratio of transmission 24. If the current traction c.v.t. ratio is less than the maximum c.v.t. ratio of transmission 24, the response at box 100 is "yes" and if the current traction c.v.t. ratio is not less than the maximum c.v.t. ratio of transmission 24, the response at box 100 is "no". If the current c.v.t. ratio is not less than the maximum c.v.t. ratio, ECU 74 adjusts transmission 24 via solenoid 80 to reduce the current traction c.v.t. ratio as shown at box 102 to facilitate the maintenance of the desired blade speed. ECU 74 then rechecks the ground speed of mower 20 at box 94.

If the current traction c.v.t. ratio is less than the maximum c.v.t. ratio, ECU 74 calculates the engine speed at box 104. Next, ECU 74 calculates the blade c.v.t. ratio reserve ratio at box 106. The blade c.v.t. ratio reserve corresponds to whether adjustable diameter pulley 48 may be further adjusted to increase the speed of blade shaft 64 relative to output shaft 36. If the relative speed of blade shaft 64 can be further increased by adjustment of pulley 48, the remaining adjustment amount constitutes the blade c.v.t. ratio reserve. If no such reserve exists, i.e., pulley 48 is already positioned to maximize the relative speed of shaft 64, the response at box 108 is "no" and the traction c.v.t. ratio is changed (ECU 74 adjusts transmission 24 via solenoid 80) to reduce the ground speed of mower 20 as shown by box 110. ECU 74 then rechecks the ground speed of mower 20 at box 94. If the response at box 108 is "no", no changes are made to the blade c.v.t. (pulley 48 in the illustrated embodiment) as shown by box 112 and the blade speed is then calculated at box 114. After calculating the blade speed at box 114, the proportional integral differential ("PID") constants are then loaded and the PID values calculated as shown by boxes 116 and 118. The loading and calculating of the PID constants may take the form of loading a table of values which provide the optimum blade speed for particular mower operating parameters and then determining the optimum blade speed by using the measured values of the mower operating parameters to select the optimum blade speed from the table of values. The operating parameters which may be included in the table of values include the engine speed and the engine load. It may also be possible for ECU 74 to store multiple PID tables wherein the operator inputs data during the initialization of ECU 74 to select the appropriate PID table. For example, there may be different tables for different grass types, grass heights, ground speeds, cut qualities, or whether or not a bag is being used to collect the clippings.

Next, at box 120, ECU 74 compares the measured blade speed with the desired blade speed. At box 122, ECU 74 determines if the measured blade speed is less than the optimum blade speed. If the measured blade speed is less, i.e., underspeed, then ECU 74 changes the blade c.v.t. ratio by adjusting pulley 48 via solenoid 62 to raise the blade speed as shown at box 124 and the process returns to box 93. At box 122, if the measured blade speed is not underspeed, the process proceeds to box 126 where ECU 74 determines if the measured blade speed is greater than the optimum blade speed, i.e., overspeed. If the blade speed is overspeed, ECU 74 changes the blade c.v.t. ratio by adjusting pulley 48 via solenoid 62 to lower the blade speed as shown at box 124 and the process then returns to box 93. At box 126, if the measured blade speed is not overspeed, the process returns to box 120 where the current measured blade speed is compared to the optimum blade speed. Similarly, if at box 108 it is determined that there is a blade c.v.t. reserve ratio available, the process proceeds to box 120 where the current measured blade speed is compared to the optimum blade speed.

In an alternative embodiment, ECU 74 may be operably coupled with an input unit which allows the operator of mower 20 to select between a quality cut algorithm and a quick cut algorithm for controlling the operation of mower 20. For example, operator display and controls 78 could allow the user to input data or select between operating algorithms by providing a select signal on input 77. Display/input device 78 would generate a signal based upon the operator input and communicate the signal to ECU 74. The quality cut algorithm would operate mower 20 in a manner which placed the highest priority on maintaining the desired blade speed. The quick cut algorithm would operate mower 20 in a manner which placed the highest priority on maintaining the ground speed of the mower.

When operating in accordance with the quality cut algorithm, ECU 74 would monitor the speed of cutting blade 32 and, when the speed of blade 32 falls below a predetermined blade speed value, ECU 74 would adjust either the rotational speed ratio between shafts 36 and 64 or the ground speed of mower 20 to raise the blade speed to its predetermined value. The blade speed could be raised by first adjusting the rotational speed ratio between output shaft 36 and blade shaft 64 by adjusting pulley 48 and, if adjustment of pulley 48 is insufficient to obtain the desired blade speed, ECU 74 could adjust transmission 24 to reduce the ground speed of mower 20 until the desired blade speed is obtained as described above with reference to the illustrated embodiment.

When operating in accordance with the quick cut algorithm, ECU would monitor the ground speed of mower 20 and, when the ground speed falls below a preselected ground speed value, ECU 74 adjusts the ground speed by adjusting the swash plate of transmission 24 via solenoid 80 or the rotational speed ratio between output shaft 36 and blade shaft 64 via solenoid 62 until the desired ground speed is obtained. For example, ECU 74 could be programmed to adjust transmission 24 until the ground speed, as measured by sensor 76, is equivalent to the preselected ground speed or transmission 24 can not be further adjusted, or it is not desirable to further adjust transmission 24, i.e., transmission 24 is positioned in a predetermined maximum setting. If, after adjustment of transmission 24 to its predetermined maximum position, the ground speed of mower 20 is still less than the preselected ground speed, ECU 74 would adjust pulley 48 via solenoid 62 and the rotational speed ratio defined thereby to reduce the relative speed of blade shaft 64 to output shaft 36. The relative speed of blade shaft 64 is reduced until either the desired ground speed is achieved, pulley 48 may no longer be adjusted, or the blade speed falls to a predefined minimum level.

In an alternative embodiment, the quick cut algorithm may utilize sensor data corresponding to the output of engine 22 such as engine speed sensor 42 or a cylinder pressure sensor for measuring the power output of engine 22. In this embodiment of the quick cut algorithm, when the ground speed, as measured by sensor 76, falls below the selected ground speed value, ECU 74 compares the measured engine output with a predetermined maximum output value and, if the measured output is less, first adjusts transmission 24 to increase the ground speed of mower 20. If the measured output is not less than the predetermined maximum output value, ECU 74 adjusts the rotational speed ratio defined by pulley 48 to reduce the relative speed of blade shaft 64 to output shaft 36.

While this invention has been described as having an exemplary design, the present invention may be further modified within the spirit and scope of this disclosure. This application is therefore intended to cover any variations, uses, or adaptations of the invention using its general principles.

What is claimed is:

1. A method of cutting grass with a lawn cutting machine having a motor with an output shaft, a rotatable cutting blade and a driven shaft with a driven wheel coupled thereto, said output shaft operably coupled to said cutting blade and said driven shaft, said driven wheel engagable with the ground for propelling said machine at a ground speed, said method comprising:

monitoring the speed of said cutting blade;
communicating the speed of said cutting blade to an electronic control unit; and
by means of the electronic control unit comparing the actual blade speed to a desired substantially constant blade speed value and adjusting one or both of the speed of said cutting blade and said ground speed to maintain the speed of said cutting blade at the desired substantially constant blade speed value while simultaneously allowing the ground speed of said machine to be varied by an operator of the lawn cutting machine.

2. The method of claim 1 wherein said motor comprises an internal combustion engine and said method further comprises the step of operating said engine at a substantially constant engine speed, wherein said step of operating said engine at a substantially constant speed comprises the use of a mechanical governor to control the engine speed.

3. The method of claim 1 wherein said step of monitoring the speed of said cutting blade comprises producing a blade speed signal representative of the speed of said cutting blade and communicating said blade speed signal to the electronic control unit.

4. The method of claim 1 further comprising the step of monitoring the ground speed of said machine.

5. The method of claim 4 wherein said step of monitoring the ground speed of said machine comprises producing a ground speed signal representative of the ground speed of said machine and communicating said ground speed signal to the electronic control unit.

6. The method of claim 1 wherein adjusting the speed of said cutting blade comprises adjusting the effective diameter of a variable diameter pulley operably disposed between said output shaft and said cutting blade.

7. The method of claim 1 wherein adjusting the ground speed comprises adjusting a continuously variable transmission operably disposed between said output shaft and said driven shaft.

8. The method of claim 1 wherein the speed of said cutting blade is adjusted by means of a first mechanical mechanism and said ground speed is adjusted by means of a second mechanical mechanism.

9. The method of claim 8 wherein said first mechanical mechanism and said second mechanical mechanism operate independently of a speed of the motor.

10. A method of cutting grass with a lawn cutting machine having an internal combustion engine with an output shaft, a rotatable cutting blade and a driven shaft with a driven wheel coupled thereto, said output shaft operably coupled to said cutting blade and said driven shaft, said driven wheel engagable with the ground for propelling said machine at a ground speed, said method comprising:

operating said engine at a substantially constant engine speed;

monitoring the speed of said cutting blade;

communicating the speed of said cutting blade to an electronic control unit; and by means of the electronic control unit comparing the actual blade speed to a desired substantially constant blade speed and adjusting one or both of the speed of said cutting blade and said ground speed to maintain the speed of said cutting blade at the desired substantially constant blade speed value while simultaneously allowing the ground speed of said machine to be varied by an operator of the lawn cutting machine.

* * * * *